(12) United States Patent
McCroskey et al.

(10) Patent No.: US 11,328,345 B1
(45) Date of Patent: *May 10, 2022

(54) SYSTEM, METHOD, AND NON-TRANSITORY COMPUTER-READABLE MEDIA FOR INTEGRATED TRANSACTIONS

(71) Applicant: United Services Automobile Association (USAA), San Antonio, TX (US)

(72) Inventors: Laura Elizabeth McCroskey, San Antonio, TX (US); Shelly Dieckow Halsey, La Vernia, TX (US); Cathy F. O'Sullivan, San Antonio, TX (US); Josh Jason Medrano, San Antonio, TX (US); Ann C. Tarrillion, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/016,718

(22) Filed: Sep. 10, 2020

Related U.S. Application Data

(63) Continuation of application No. 15/901,814, filed on Feb. 21, 2018, now Pat. No. 10,810,656.
(Continued)

(51) Int. Cl.
*G06Q 30/06* (2012.01)
*G06F 3/0482* (2013.01)

(52) U.S. Cl.
CPC ....... *G06Q 30/0641* (2013.01); *G06F 3/0482* (2013.01); *G06Q 30/0623* (2013.01); *G06Q 30/0639* (2013.01)

(58) Field of Classification Search
CPC .......... G06Q 30/0641; G06Q 30/0623; G06Q 30/0639; G06Q 30/0601–0645; G06F 3/0482
(Continued)

(56) References Cited

U.S. PATENT DOCUMENTS 8,825,505 B1 9/2014 Alava
2003/0046179 A1* 3/2003 Anabtawi .......... G06Q 30/0625
705/26.5

(Continued)

OTHER PUBLICATIONS

AutoGravity's National Expansion Forever Changes How Consumers Buy and Lease Cars: Revolutionary digital platform connecting car buyers, lenders and dealers available across the US. Jan. 25, 2017 (Jan. 25, 2017). PR Newswire Association LLC. (Year: 2017).*

(Continued)

*Primary Examiner* — Allison G Wood
(74) *Attorney, Agent, or Firm* — Fish & Richardson P.C.

(57) ABSTRACT

An integrated platform and associated interface(s) facilitate a transaction, such as a purchase of a vehicle or other item. The platform integrates information of multiple types received from various sources. Such information may be associated with a transaction, or possible future transaction, to purchase an item such as a vehicle. For example, the platform may receive and integrate information regarding user vehicle preferences, financing for the vehicle, insurance to cover the vehicle, total cost of ownership for the vehicle, prior vehicle trade-in information, dealer availability and price comparison information, user budget analysis, and/or other information. The platform presents information through interface(s), which are accessible through interface elements that each corresponds to a stage in the process to select and purchase an item. The displayed characteristics of (Continued)

each element are changeable to reflect the current status of the stage corresponding to the element.

21 Claims, 8 Drawing Sheets

Related U.S. Application Data

(60) Provisional application No. 62/461,336, filed on Feb. 21, 2017.

(58) Field of Classification Search
USPC .............................................. 705/26.1–27.2
See application file for complete search history.

(56) References Cited

U.S. PATENT DOCUMENTS

| | | |
|---|---|---|
| 2004/0002915 A1 | 1/2004 | McDonald |
| 2011/0153449 A1 | 6/2011 | Hite |
| 2011/0251897 A1* | 10/2011 | Litvack .............. G06Q 30/0277 |
| | | 705/14.58 |
| 2013/0311306 A1* | 11/2013 | Liu ....................... G06Q 30/02 |
| | | 705/14.73 |
| 2015/0081474 A1 | 3/2015 | Kostka et al. |
| 2015/0221010 A1* | 8/2015 | Ming ................... G06Q 10/087 |
| | | 705/26.61 |
| 2015/0254762 A1 | 9/2015 | Fisher |
| 2016/0180420 A1 | 6/2016 | Gamel, Jr. et al. |
| 2016/0239907 A1 | 8/2016 | Dolen |
| 2017/0116603 A1 | 4/2017 | Bogaard |

OTHER PUBLICATIONS

Dialog.proquest,com [online] "AutoGravity's National Expansion Forever Changes How Consumers Buy and Lease Cars: Revolutionary digital platform connecting car buyers, lenders and dealers available across the US," Jan. 25, 2017, retrieved on Aug. 12, 2020, retrieved from URL <https:/dialog.proquest.com/professional/docview/ 1 B61301028?/accountid=131444>, 3 pages.

* cited by examiner

Let's Get Started

Customize your car buying experience by answering a few questions

Have you already found a car to buy?
○ Yes
○ No

When are you planning to buy?

How much down payment will you make?

Who's going to drive the car?

Are you replacing a vehicle you currently own?
○ Yes
○ No

From whom do you plan on buying?
○ Dealer
○ Private Seller
○ Not Sure

Skip    Menu

Let's Get Started

Customize your car buying experience by answering a few questions

Have you already found a car to buy?
○ Yes
○ No 1 week
1 month
6+ months
Not Sure Who's going to drive the car?

Are you replacing a vehicle you currently own?
○ Yes
○ No

From whom do you plan on buying?
○ Dealer
○ Private Seller
○ Not Sure

Skip    Menu

Let's Get Started

Customize your car buying experience by answering a few questions

Have you already found a car to buy?
○ Yes
● No

When are you planning to buy?
1 Week

How much down payment will you make?
$2000

Who's going to drive the car?
Yourself

Are you replacing a vehicle you currently own?
○ Yes
● No

From whom do you plan on buying?
● Dealer
○ Private Seller
○ Not Sure

Skip    Menu

*FIG. 3C*

SYSTEM, METHOD, AND NON-TRANSITORY COMPUTER-READABLE MEDIA FOR INTEGRATED TRANSACTIONS

CROSS-REFERENCE TO RELATED APPLICATIONS

This application is a continuation application of and claims priority under 35 U.S.C. § 120 to U.S. application Ser. No. 15/901,814, filed on Feb. 21, 2018, which is related to, and claims priority to, U.S. Provisional Patent Application Ser. No. 62/461,336, titled "Integrated Transaction Interface and Platform," which was filed on Feb. 21, 2017, the entire contents of each of which are incorporated herein by reference.

BACKGROUND

Typically, purchasing a vehicle or other expensive item may be a stressful experience for an individual. The potential purchaser walking through a showroom or a vehicle sales lot may be confronted with sales personnel whose goal is to maximize the sale price and who may not necessarily be focused on the purchaser's concerns. Moreover, the purchaser may be disadvantaged during negotiations with the seller, given that the purchaser may not have on-site access to objective information that would inform the purchase decision. For these reasons, the purchaser may lack confidence that they are getting the best deal or that their other concerns have been adequately addressed.

SUMMARY

Implementations of the present disclosure are generally directed to facilitating and/or optimizing a transaction. More specifically, implementations are directed to providing an integrated transaction interface and platform that integrates information from various data services to provide a centralized hub that facilitates progress through a multi-stage process associated with a transaction to purchase an item.

In general, innovative aspects of the subject matter described in this specification can be embodied in methods that include operations of: accessing status data describing a status for each stage in a multi-stage process to acquire an item; presenting a first view of a hub interface that includes interface elements that each correspond to a respective stage in the multi-stage process, wherein at least one of the interface elements is presented with at least one presentation characteristic that depends on the status of the stage corresponding to the respective interface element; in response to receiving a selection of an interface element through the hub interface, providing access to a data service associated with the stage corresponding to the selected interface element; and presenting a second view of the hub interface that includes the selected interface element presented with the at least one presentation characteristic altered based on a changed status of the stage corresponding to the selected interface element, wherein the status of stage is changed through the access to the corresponding data service.

Implementations can optionally include one or more of the following features: the at least one presentation characteristic of the selected interface element includes one or more of a size, a shape, a color, and a position of the selected interface element; the at least one presentation characteristic of the selected interface element includes text data that is presented within the selected interface element; the selected interface element is presented, in the first view, with first text data; the selected interface element is presented, in the second view, with second text data that is different from the first text data; at least a portion of the second text data is generated based on at least one action performed through the corresponding data service; the selected interface element is presented, in the first view, without the text data; the selected interface element is presented, in the second view, with the text data that is generated based on at least one action performed through the corresponding data service; the selected interface element is presented with the at least one presentation characteristic that is altered to indicate a completed status of the stage corresponding to the selected interface element; the access to the data service is provided within a frame of the hub interface; and/or the frame is presented as an expansion of the selected interface element in the hub interface.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and improvements over traditional systems. By providing an integrated user experience for managing a transaction, or multiple transactions, for an item purchase, implementations avoid the expenditure of processing capacity, network bandwidth, active memory, storage capacity, and/or other computing resources that would otherwise be spent by previously available solutions in which multiple, different, and separate interfaces are provided to a user to facilitate their purchase transaction and the various ancillary transactions associated with the purchase. Moreover, by presenting interface elements with displayed characteristics corresponding to the status of the particular stages associated with the interface elements, implementations provide a user experience that is more efficient and easier to navigate, by a user, compared to previously available solutions. Accordingly, implementations avoid the expenditure of computing resources that previously available solutions expend to handle, and recover from, user errors and/or user indecision in interface navigation caused by a confusing user experience that does not adequately guide and direct the user's attention. The implementations described herein more effectively guide and direct the user's attention by altering the displayed characteristics of the interface elements according to the status of each stage corresponding to a respective interface element.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 3A-3C depict example interfaces for transaction processing, according to implementations of the present disclosure.

DETAILED DESCRIPTION

Figure 1:
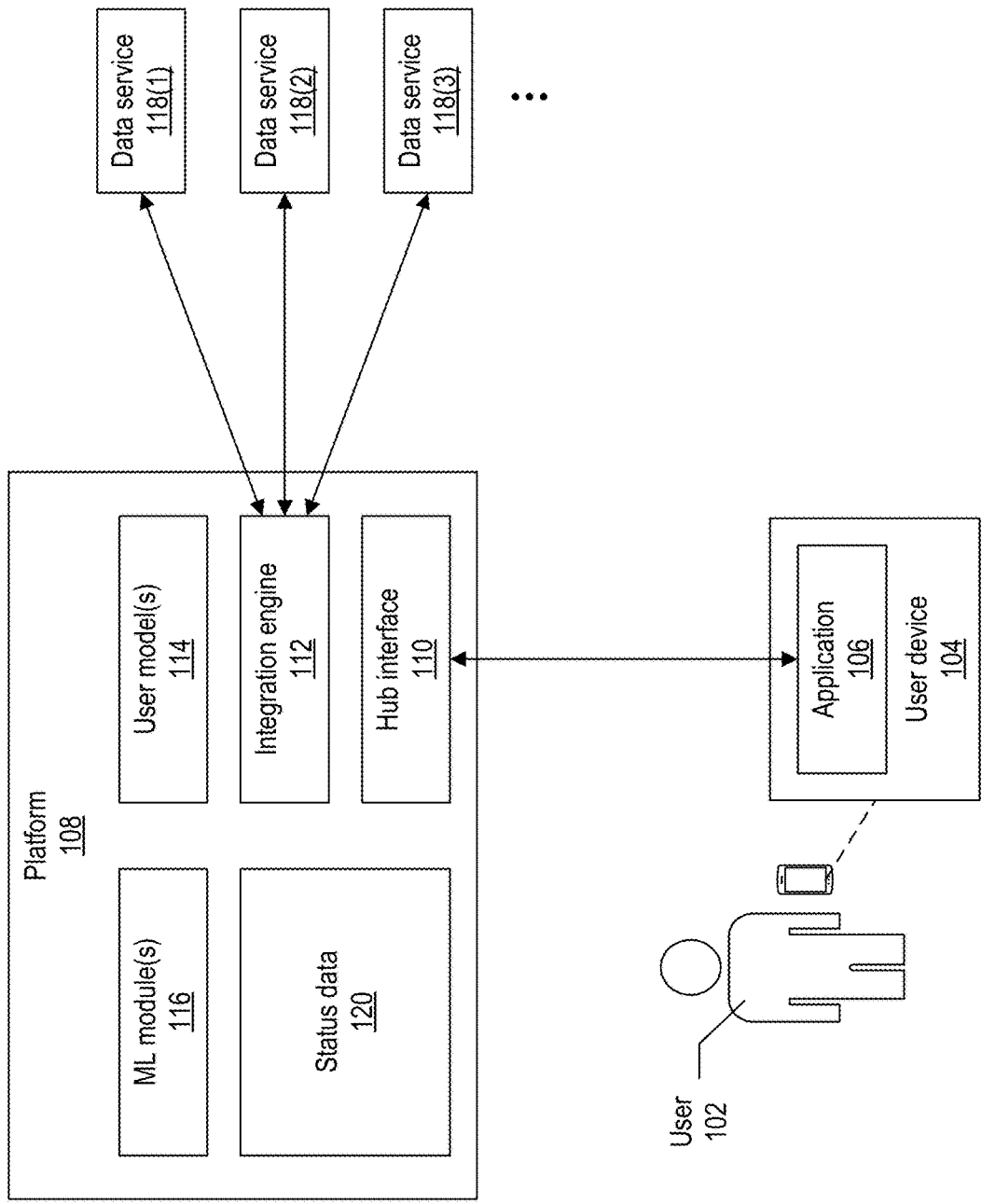
FIG. 1 depicts an example system for transaction processing, according to implementations of the present disclosure.

Implementations of the present disclosure are directed to an integrated platform and one or more interfaces to facilitate a transaction, such as a purchase of a vehicle or other item. A platform, also described as a hub, can integrate information of multiple types, which may be received from multiple sources. Such information may be associated with a transaction, or possible future transaction, to purchase an item such as a vehicle. For example, the platform may receive and integrate information regarding user vehicle preferences, financing for the vehicle, insurance to cover the vehicle, total cost of ownership for the vehicle (e.g., including projected maintenance costs, fuel costs, and so forth), prior vehicle trade-in information, dealer availability and price comparison information, user budget analysis, and/or other information. The platform may present the integrated information, or at least a portion of the integrated information, through a user experience that provides one or more interfaces. In some implementations, the user experience can be presented through a mobile application (app) executing on the user's portable computing device (e.g., smartphone, tablet computer, wearable computer, etc.). In some implementations, the user experience can be a web site that is presented through an application that executes within a container for presenting web information, such as a web browser executing on the user's computing device.

The information provided through the interface(s) may provide decision support for the user at various stages of the vehicle purchase process by presenting the integrated data from a variety of sources, where such data is relevant to the purchase process. The interface may enable the user to research various vehicles that may be purchased, search for vehicles based on input criteria, view information on a variety of vehicles, and/or view information regarding cost of insurance for vehicles. The interface may also present information for budgeting, such as an indication of how much the user can (or is advised to) spend on the vehicle, such as a maximum amount, a recommended range of vehicle prices, and/or other recommended expenditures.

Traditionally, the data needed to help a user purchase a vehicle is available from multiple, disparate data sources. For example, the user may consult an insurance company web site to gather insurance information and apply for an insurance policy, a vehicle search web site (or dealer web site) to search for vehicles, a financial institution to determine financing for the vehicle and/or budgetary considerations, and so forth. Accordingly, the traditional vehicle purchase experience, using previously available resources, typically requires a potential purchaser to navigate multiple interfaces provided by different services or companies, and/or engage in multiple in-person consultations with separate organizations, which may be time-consuming and require considerable effort by the purchaser. Implementations provide a centralized platform (hub) of information that the user can access, through an interface, to facilitate their vehicle search and purchase process. The hub also facilitates various other activities involved in the vehicle acquisition process, such as applying for insurance, securing a loan, handling a trade-in vehicle, and so forth.

In some implementations, the purchase process (or process related to some other type of transaction) may be a multi-stage process that includes multiple stages such as determining financing for a vehicle, searching for vehicle(s) to purchase, determining insurance on the vehicle, purchasing the vehicle, and so forth. The platform may track where the user is in each stage of the process, and store the user's progress for each stage. The interface may access the progress information tracked by the platform and present, to the user, their current status with respect to each stage, such as the status of the user with respect to determining how to finance the vehicle (e.g., loan application(s)), determining insurance (e.g., policy application(s), option(s) for coverage, etc.), determining the user's budget, and so forth. Information for the various stages of the purchase process may be determined based on the user's situation, such as whether the user is trading in another vehicle to purchase their next vehicle, whether the user is purchasing a new versus a used vehicle, whether the user is buying versus leasing a vehicle, and so forth.

The main interface (e.g., top page, landing page, entry point, etc.) of the user experience provided by the hub may be a hub interface that includes multiple interface elements. In some implementations, each interface element corresponds to a particular stage in the multi-stage process. For example, the hub interface can include interface elements related to stages of the vehicle purchase process, such as stages for getting started, applying for a loan, applying for insurance, handling the trade-in of a previously purchased vehicle, shopping for and/or searching for a vehicle to purchase, budget and/or affordability analysis, e.g., including total cost of ownership (TCO)) analysis, and so forth. Each element can be used to navigate to a particular service that facilitates activities related to the corresponding stage. For example, clicking on or otherwise selecting an interface element related to financing launches an interface that provides a service for loan application and/or viewing the status of a loan application. As another example, clicking on or otherwise selecting an interface element for vehicle search launches an interface for vehicle search, to enable the user to find vehicles that match various criteria for price, make, model, year, trim features, performance, gas mileage, and so forth. Moreover, each element that is presented in the hub interface can present information regarding the corresponding stage of the purchase process, as text data presented within the element. Such text data is also described as micro-data. For example, the interface element for financing can display a summary of the user's current status in applying for a vehicle loan, such as whether the application is approved, the approved amount of the loan, and so forth.

The interface elements related to various stages may be rendered as any appropriate type of interface element that is suitable for presentation within the integrated hub experience. For example, interface elements can be tiles, buttons, list elements, graphics, and/or other types of UI elements. In some implementations, the interface elements are dynamic and may be updated (e.g., in real time) based on changes in the underlying data. For example, the presentation in the hub interface of the element describing the status of financing for a vehicle may be updated dynamically to indicate that a loan application has been approved for a particular amount, with particular loan term, interest rate, and so forth. Such updates can include changes to various appearance characteristics of the element, such as its size, shape, color, fonts, position in the hub interface, whether it is presented or not presented in the hub interface, and so forth. In some implementations, the particular appearance of an interface element displayed in the hub interface indicates the user's status in the corresponding stage of the multi-stage process for vehicle purchase. For example, the interface element for financing can have a first appearance (e.g., size, shape, position, color, micro-data, etc.) if the user has not yet applied for a loan, a second appearance if the user has applied for a loan and the loan application is pending, and a third appearance if the user's loan application has been approved.

The platform can store status information describing the user's current status in each of the stages of the multi-stage process, and the hub interface may receive real-time updates of the status information from the platform, and alter the appearance of the interface elements based on the current status information for each stage. In some implementations, the platform may track the status of each stage in a database that is updated with current status information regarding each stage. Status information can also be described as status data. The database may track which stages have been completed, which stages are yet to be initiated, which stages are in progress, and the particular status of each stage, and the interface element for each stage may present progress information (e.g., not started, completed, in progress) for the corresponding stage. The hub interface and platform may enable the user to work on the various stages in any suitable order, serially and/or in parallel. For example, the user may apply for financing and begin searching for vehicles even before financing (e.g., a loan application) has been approved and completed.

In some implementations, the hub interface can dynamically rearrange the various interface elements corresponding to various stages of the purchase process, and/or otherwise change the appearance of the interface elements, as a way of indicating the current status of each stage. The appearance of the interface elements can also be changed to (e.g., visually) indicate that some stages may be higher priority than others. In this way, implementations may guide the user through the purchase process in an optimal, time-efficient, and/or cost-effective order of stages. The hub interface may provide notifications to the user to indicate information that is missing, to be provided by the user and/or modified by the user, for various stages. For example, the hub interface can provide a "hit list" or "to-do list" that is a summary of tasks yet to be performed by the user in their vehicle purchase process. The platform may also send urgent notifications (e.g., as warnings through the hub interface and/or communications to the user) to indicate information that is urgently needed from the user and/or action(s) that the user should perform soon.

In some implementations, the user may be provided with vehicle recommendations (e.g., through a vehicle search interface element) that are based on the user's budget, expressed user preferences, and/or other criteria. Such recommendations may be adjusted dynamically in response to changes in other data. For example, a recommendation may be made that the user cut back on other expenses to increase their vehicle buying budget. Modification of the budget information may then lead to a change in which vehicles are shown to the user.

In some implementations, the platform may communicate (e.g., over one or more networks) with one or more data services. Such data services may be external to the platform, or may be executing within the platform. Each data service may provide a particular type of data, such as vehicle search data, insurance data, budget data, TCO data for vehicles, and so forth. The platform may integrate the data that is received from the various data services, to provide an integrated vehicle purchase experience to the user through the hub interface. In some instances, an interface of a data service may be presented within the interface of the platform, such as in a frame that is rendered within the hub interface, to provide the user with access to the features of the data service. The presentation of the data service interface within the hub interface may provide a seamless user experience (e.g., with consistent branding, look-and-feel, etc.) to the user. In some instances, an interface of a data service may be presented separately from the hub, e.g., in a separate window or separately executing user experience on the user's computing device. The interface of a data service can be launched, either within the hub interface or as a separate interface, in response to the user clicking on, gesturing on, selecting, or otherwise manipulating the interface element corresponding to the stage that the data service facilitates. For example, clicking on the vehicle search interface element can launch the interface of the vehicle search data service.

In some implementations, a single login by the user is sufficient to access the hub interface of the platform as well as the interface(s) of the various data service(s), in instances where the data service interface(s) are embedded in the hub interface of the platform and/or the data service interface(s) are launched separately from the hub interface. The single login may be based on the validation of user credentials to authenticate the user, such as a username, password, personal identification number (PIN), biometric data (e.g., fingerprint, voice print, facial recognition, etc.), and so forth. Various other fraud prevention techniques can be used to verify that user is authorized to access the platform, hub interface, and/or various data service interfaces, such as location checking, device registration checking, and so forth.

In some implementations, data regarding the user may be collected and employed to pre-seed a vehicle search session for the user with one of the data services. For example, information may be gathered regarding the user's budgetary constraints, vehicle preferences, new versus used vehicle preference, and so forth, and such information may be provided to a vehicle search data service. The vehicle search data service may prepare a list of vehicles that satisfy the constraints for the particular user, such that the list of vehicles is ready for immediate presentation to the user when the user enters the vehicle search stage of the purchase process and views the data service interface for the vehicle search data service.

In some implementations, vehicle searching may be facilitated through use of a user model that is developed for each particular user. The user model may predict what vehicles are suitable for a user, given the user's expressed or implied vehicle preferences, budgetary constraints, and/or other factors. In some implementations, the user model may be trained and/or refined using one or more machine learning (ML) techniques, including supervised and/or unsupervised machine learning. The model may initially be developed based on budgetary information for the user. The model may then be refined based on the user's express vehicle preferences, as determined through the user's browsing of vehicles through the vehicle search data service. For example, the user may "like," "favorite," and/or save a particular vehicle in a list of possible purchase options, and such expressed user preferences may be captured and used to further refine the user model for predicting suitable vehicles for the user. The user's implied preferences may also be used to refine the model. Such implied (or inferred) preferences may be determined based on the amount of time a user spends viewing information for particular vehicles through the vehicle search data service, even in instances where the user does not explicitly "like" or add the vehicle to a favorites list.

The user may select certain vehicles that are presented to the user as (e.g., pre-seeded or pre-populated) search results through the vehicle search data service. The data service may send the selection information back to the platform, which may use the selection information to refine the user model for the user. The selection information may also be used to populate a selected vehicles interface element of the hub interface, indicating that some progress has been made in the vehicle selection stage of the purchase process. The selection of cars may be an iterative process. For example, after the user selects a first set of vehicles that they are interested in, the user model may be refined based on such selections, and the user may be presented a more specific or otherwise altered set of possible vehicles through the vehicle search data service. Any suitable number of iterations of this present-select-refine cycle may be performed until the user decides on a particular vehicle to target for purchase. In this way, the user model may be a learning model that adjusts based on the user behavior and/or other sources of dynamic information regarding the user. The platform may store a list of saved vehicles that the user has "liked," "favorited," or otherwise expressed an interest in through the vehicle search data service.

In some implementations, the hub interface may include various interface elements showing the current status and relevant information for each of multiple stages in the vehicle purchase process. In some implementations, this user experience is dynamically updated such that each interface element presents up-to-date information and status for each stage of the process. Accordingly, the hub interface can be a portable user experience that is presented in a variety of environments that are relevant to the purchase process. For example, while the user is browsing vehicles through the vehicle search data service, and engaging in the vehicle selection stage of the process, the hub interface may be available to show the user various information regarding other stages, such as the status of financing, budget constraints, insurance application, and so forth. In some implementations, the hub interface may be available to the user across different experiences, such as the vehicle search data service, a third party financing data service, third party insurance data service, and so forth. The hub interface may also be a mobile interface that enables the user to access the information when the user is on-site at a vehicle dealership or in some other purchase environment. Thus, implementations provide the user with easy access to relevant information in situations where such information may be useful, such as when negotiating a vehicle purchase with a dealer, negotiating financing with a lender, and so forth.

In some instances, the hub interface and its various interface elements may be presented based on location context, such as the current location of the user's computing device determined through a satellite-based navigation system (e.g., GPS) or through other techniques. The presentation of the interface, such as the ordering of the interface elements, may be adapted to ensure that the information that is more relevant to the user's location is presented at the top (or otherwise prominently) in the interface. For example, based on a determination that the user is currently on-site at a dealership, the hub interface may present the vehicle search interface element in a prioritized position and/or otherwise highlight the appearance of the element, to facilitate the user's access to vehicle information for those vehicles that are currently present (in stock, available for purchase) at that dealership.

The hub interface may include an interface element that presents information, status, and provides access to a data service for one or more of the following:

Price information, describing a price of vehicle(s). In some instances, the price may be a guaranteed price, a guarantee that the user may purchase the vehicle at the price for a certain period of time. For example, the guarantee may hold the price of the vehicle for up to 24 hours.

Loan information, describing the terms of a loan that the user may take out to finance their purchase of a vehicle. The loan information may include an amount of the loan, a payoff amount, an interest rate, monthly payments (e.g., principal and/or interest payments), a term of the loan (e.g., number of months to pay off the loan), an indication of the financial institution providing and/or servicing the loan, and so forth.

Insurance information, describing the terms of an insurance policy that the user may take out to insure a vehicle. The insurance information may include terms such amount(s) of property damage and/or injury coverage, premiums, deductibles, time period for the policy, conditions on the policy, and so forth.

Vehicle history information, describing a history of repairs, maintenance, parts replacement, accidents, prior ownership, and/or other information regarding the history of the vehicle, e.g., in instances where the user is shopping for used vehicles.

Vehicle cost information, including estimated maintenance, repair, and/or operating costs of a vehicle for a period of time in the future. Such cost information may include fuel costs, costs to replace engine components, tires, or other parts of the vehicle, estimated maintenance costs based on the costs of other vehicles of the same make, model, year, and/or other characteristics, and so forth. Such information may provide a TCO (e.g., monthly, yearly, etc., cost of ownership) for the vehicle in the future.

Trade-in information regarding the trade-in value of the user's current vehicle, in instances where the user is seeking to trade in a current vehicle to purchase a new vehicle.

Other vehicle information, including the availability and/or price of other instances of the same and/or similar vehicle at other (e.g., nearby) sellers. In some implementations, the interface may enable the user to specify a distance or range to search for similar nearby vehicles, e.g., within 5 miles of the current location, within 50 miles of the current location, and so forth. Implementations may employ any suitable technique for determining the current location of the user and/or the user device. For example, location may be determined using a satellite-based navigation system such as the global positioning system (GPS). Nearby vehicle(s) may include new vehicle(s), used vehicle(s), and/or both new and used vehicle(s), according to the expressed preferences of the user for new versus used vehicles. Nearby vehicle(s) may include vehicle(s) that are available for purchase and/or vehicle(s) that are available for rental or lease, according to the expressed preferences of the user for purchasing versus leasing a vehicle.

Although examples herein may describe and/or depict vehicles as automobiles, implementations are not so limited. Vehicle(s) may include automobiles, motorcycles, mopeds, campers, recreational vehicles, off-road vehicles, watercraft, aircraft, and/or other types of vehicles. Moreover, the implementations described herein may also be used to facilitate and/or optimize transactions to purchase or otherwise acquire other types of consumer products, including but not limited to home electronics, appliances, real property (e.g., houses or other structures), and so forth.

FIG. 1 depicts an example system for transaction processing, according to implementations of the present disclosure. As shown in the example, a user 102 may employ a user device 104. The user device 104 may be any suitable type of computing device, such as a portable computing device (e.g., smartphone, tablet computer, wearable computer) or less portable computing device (e.g., laptop computer, desktop computer, etc.). The user device 104 may execute an application 106 (e.g., an app) that is employable to access a hub interface 110 provided by the platform 108. The platform 108 may execute on any suitable number and type of computing devices. The hub interface 110 may be presented within the application 106 executing on the user device 104.

The platform 108 may include an integration engine 112 that receives data from any suitable number of data services 118. For example, the data services 118 may include a vehicle search data service as described above. The platform 108 may also execute one or more ML modules 116 that generate and/or refine user model(s) 114. As described above, a user model 114 for the user 102 may be employed to determine one or more vehicles to be presented to the user 102, e.g., through search results provided in an interface of a vehicle search data service 118. As described above, one or more of the data services 118 may provide a data service interface that is presented within (e.g., embedded in) the hub interface 110 of the platform 108. Examples of the hub interface 110 are described further below.

In some implementations, the user 102 may be required to login to the application 106, and be authenticated as an authorized user of the application who is authorized to access the hub interface 110. Authentication may be based on credential(s) such as a login name, password, personal identification number (PIN), biometric data, and so forth.

The platform 108 can also store status data 120 describing the current status of the user 102 with respect to each stage of the multi-stage purchase process. The status data 120 for a particular stage can be received from the data service 118 that provides functionality for advancing in that stage. For example, the status data 120 for a stage can include whether the user has started or completed the stage and/or whether the user is currently in progress for a particular stage. The status data 120 for a stage can also include information that the user has provided, and/or that has been generated for the user, with respect to the particular stage. For example, status data 120 for the financing stage (e.g., loan application) stage can indicate whether the loan application process has been started, whether the application has been submitted, whether the application has been approved or denied, and/or information describing the amount and terms of the loan, the identity of the lender, and/or other data if the loan has been approved.

Figure 2:
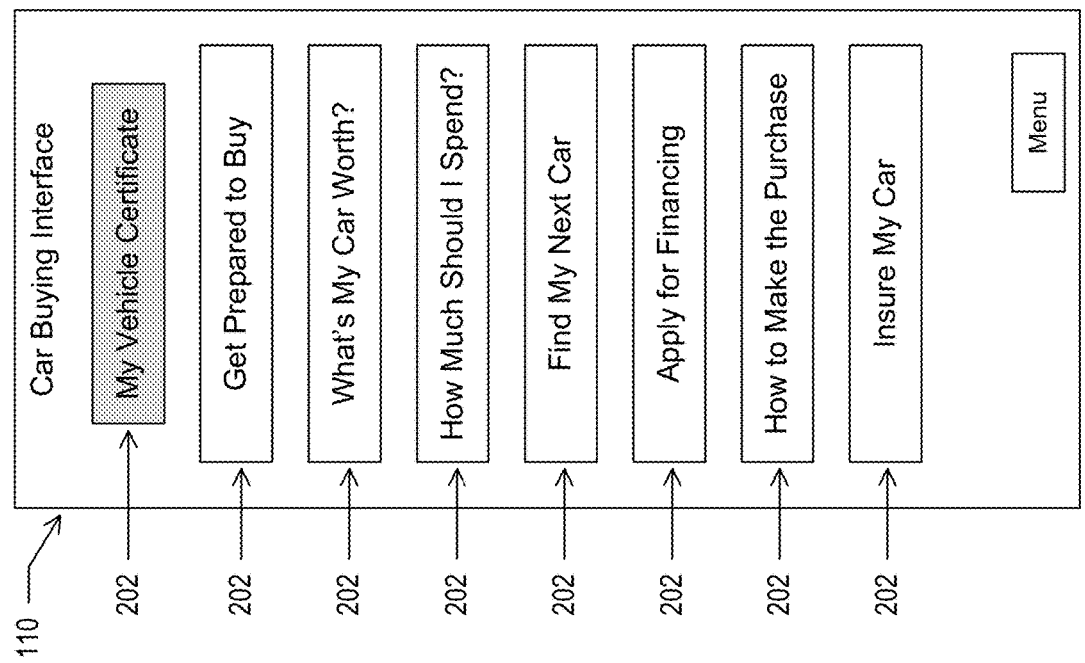
FIG. 2 depicts an example interface for transaction processing, according to implementations of the present disclosure.

FIG. 2 depicts an example interface 110 for transaction processing, according to implementations of the present disclosure. As shown in the example, the hub interface 110 may include any suitable number of interface elements 202 each presenting information regarding a particular stage of the vehicle buying process. For example, the interface elements may include interface elements for one or more of the following: "Get Prepared to Buy," "What's My Car Worth," "How Much Should I Spend," "Find My Next Car," "Apply for Financing," "How to Make the Purchase," and/or "Insure My Car." The interface may also include an interface element to present a certificate for a vehicle, e.g., "My Vehicle Certificate." The "Get Prepared to Buy," may be used early in the vehicle purchase process to enter preliminary information describing the user's overall preferences for the vehicle purchase process. On selecting the "Get Prepared to Buy," interface element, the hub interface 110 may present a particular data service interface that enables activities for initial preparation to buy a vehicle, as shown in FIGS. 3A-3C.

FIGS. 3A-3C depict example interfaces for transaction processing, according to implementations of the present disclosure. Selecting an interface element 202 corresponding to the initial data collection data service (e.g., "Get Prepared to Buy" or "Let's Get Started") can cause the platform to launch a particular interface 302 for the initial data collection data service. As shown in the example of FIG. 3A, the interface 302 may present preliminary questions to enable the user to customize their vehicle buying experience. For example, the user may be asked to enter information regarding: whether they have already found a vehicle to buy, when they are planning to buy the vehicle, how much down payment they are planning to make, whether they are replacing a currently owned vehicle, whether they plan on buying from a dealer, private seller, or are not sure yet, and/or other questions. The interface may include an option to "Skip" the current screen and go a next screen. The interface may also include a control "Menu" to return to the overall presentation of hub interface elements shown in FIG. 2.

FIG. 3B shows an example interface 302 that may be presented following the user's activation of the "When are you planning to buy?" dropdown menu. The dropdown menu may include various options for specifying the timing of the purchase, such as within one week, within one month, within six or more months, or not sure. FIG. 3C shows an example interface 302 in which the user has entered questions to the various preliminary questions. The data entered through this screen may be used to customize the purchase process for the user, for example by showing used versus new vehicles, vehicles available from a dealer versus from a private seller, vehicles that are available within a short time period (e.g., for purchase within the week) versus vehicles that may be available later, and so forth.

Figure 4:
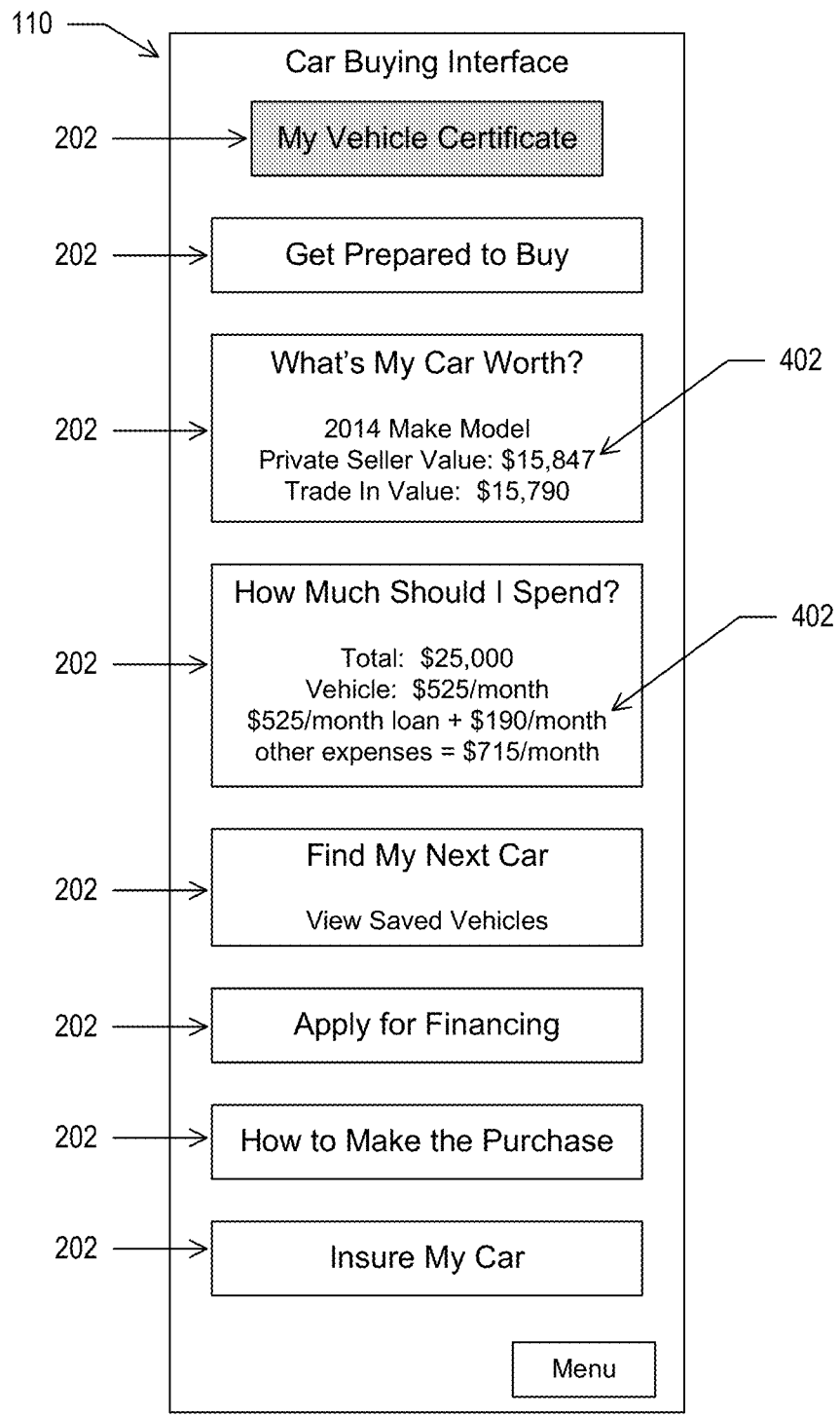
FIG. 4 depicts an example interface for transaction processing, according to implementations of the present disclosure.

FIG. 4 depicts an example interface for transaction processing, in which the presentation of the hub interface 110 has been altered based on the user's interactions with one or more of the data services, such as the user's activities in the initial data service interface shown in FIGS. 3A-3C. In this example, some of the interface elements 202 have been populated with information 402 (e.g., micro-data) associated with the corresponding stages of the buying process. For example, as shown in FIG. 4, the user has provided information describing their current vehicle (e.g., a 2014 Make Model type of vehicle), through the initial data collection data service of FIGS. 3A-3C or through some other data service. This interface element 202 has been populated with information 402 regarding this vehicle, such as its private seller value and trade-in value. Such data may be received from the initial data collection data service that provides information describing the current value of various vehicles according to their make, model, year, options, and/or other vehicle characteristics, and stored in the status data 120.

In the example of FIG. 4, the budgetary constraints interface element (e.g., "How Much Should I Spend?") has also been populated based on information 402 regarding the user, such as their current assets, debts, monthly income, monthly expenses (including other debt payments), and so forth. Such data may be entered by the user and/or received from a data service such as a bank, credit union, or other financial institution. Based on the financial status information for the user, the budgetary constraints item may be populated with information such as a total purchase price that the user can afford, the monthly cost of a vehicle that the user can afford to pay each month. Monthly cost may be broken down into components, such as cost of monthly loan payments, other costs of owning and/or operating a vehicle (e.g., fuel costs, insurance premium, maintenance expenses, licensing fees, taxes, etc.).

The vehicle search interface element (e.g., "Find My Next Car") has also been populated with a control to enable the user to expand the interface element and view a list of vehicles that are recommended for the user and/or vehicles that the user has previously flagged (e.g., liked, favorited, preferenced, etc.) through the vehicle search data service interface.

In some implementations, the data provided by the user and/or retrieved from data service(s) may be employed to generate (e.g., prepopulate) a loan application based on the particular financial characteristics or other characteristics of the user, such as their credit history, credit score, current lines of credit, employment, and so forth, and that loan information may be presented in the financing item (e.g., "Apply for Financing"). Such data may also be employed to generate an insurance policy application based on the particular characteristics of the user, such as their driving history, location, vehicle usage patterns (e.g., number of miles driven per year), whether the vehicle is to be used for personal and/or commercial purposes, and so forth. Insurance policy information may be presented to the user through the "Insure My Car" interface element of the interface. The financing and insurance interface elements may be employed by the user to apply for a loan and/or insurance policy respectively. The interface elements may also, respectively, show current status of the loan and insurance applications, including whether the user has been approved, whether more information is being requested from the user, whether funds for the loan have been disbursed, whether the insurance policy is currently active, and/or other information.

Through the integration of vehicle search, loan application processing, insurance application processing, pricing data (e.g., for a guaranteed vehicle price), budget information, and/or other information, the platform 108 and its hub interface 110 supports a seamless and/or expedited process for purchasing a vehicle or other item. This process may be personalized for the particular user, e.g., the loan information, insurance information, and/or other transaction data may be particularly generated for and tailored to the user. The implementations described herein may be employed to provide the user with a seamless, hassle-free, vehicle buying experience that may involve less negotiation than traditional vehicle buying experiences. In some implementations, the vehicle may be purchased without requiring the user to negotiate and/or haggle with a seller and/or sales personnel at a dealership.

Figure 5:
FIG. 5 depicts an example interface for transaction processing, according to implementations of the present disclosure.

FIG. 5 depicts an example interface for transaction processing, according to implementations of the present disclosure. FIG. 5 shows an example of a hub interface 110 that may be provided by the platform, such as a web interface. The hub interface 110 presents various interface elements 202 that are each associated with a particular stage in the multi-stage purchase process. In this example, at least some of the elements 202 are presented with information 402 (e.g., micro-data) indicating a status of the user's progress in the particular stage, and/or information that has been provided by and/or generated for the user in this particular stage, e.g., through an associated data service.

In the example of FIG. 5, the elements 202 each include a control 502 that enables the launch of the particular data service interface associated with the stage. The controls 502 can be presented according to the current status of the stage. For example, as shown in FIG. 5, the control 502 can be presented with an "Edit" caption if the stage has begun and/or is in progress, or the control 502 can be presented with a "Start" capture if the stage has not yet begun, e.g., if the user has not provided any data or performed any activities with respect to the particular stage. The control 502 can also be presented with a caption that is relevant to the particular tasks involved in the stage. For example, the interface element 202 for vehicle search includes a control 502 with a capture "Search." Clicking on or otherwise manipulating the control 502 launches the interface for the associated data service that allows the user to make progress in the particular stage, as described above.

Figure 6:
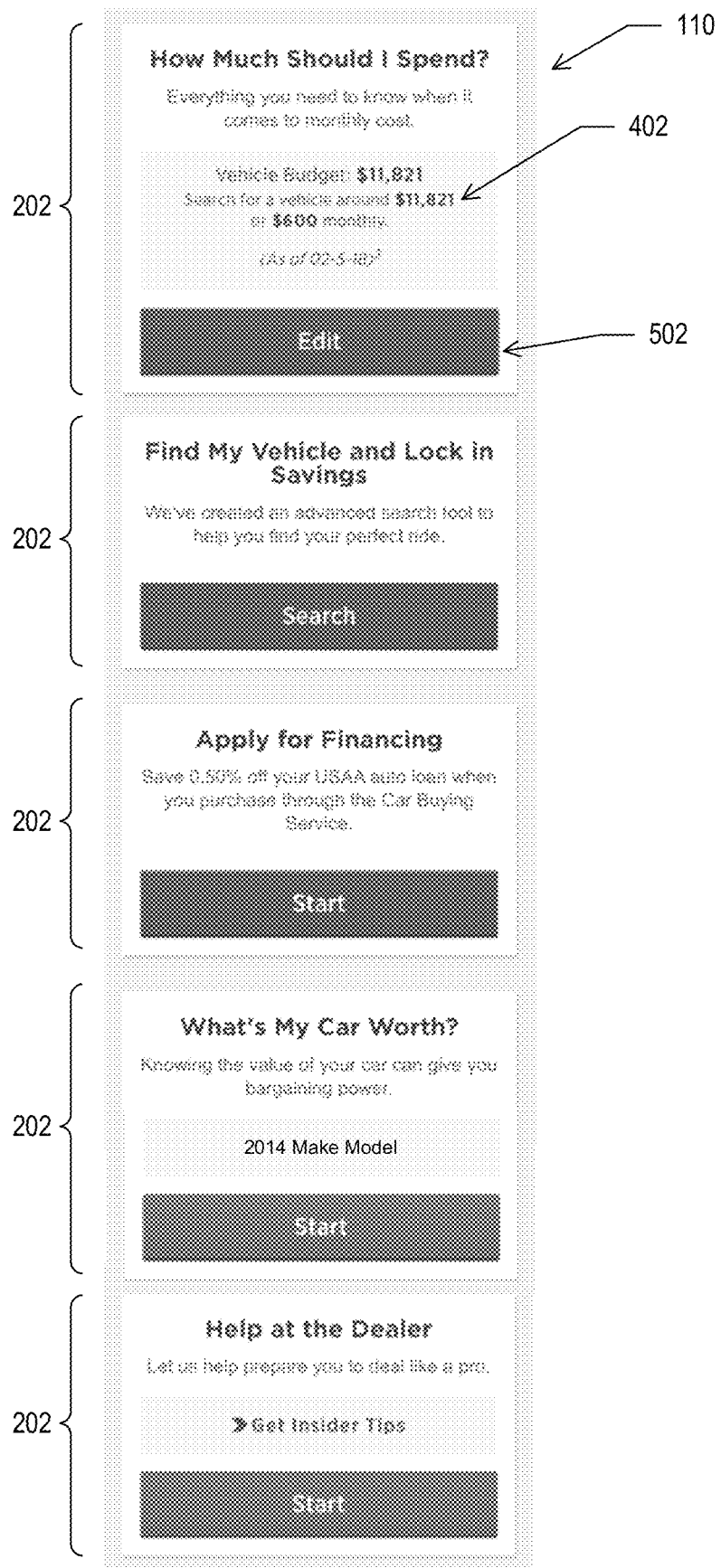
FIG. 6 depicts an example interface for transaction processing, according to implementations of the present disclosure.

FIG. 6 depicts an example interface for transaction processing, according to implementations of the present disclosure. FIG. 6 shows an example of a hub interface 110 that may be provided by the platform, such as a mobile interface in a mobile app presented on a smartphone or other portable computing device. The hub interface 110 presents various interface elements 202 that are each associated with a particular stage in the multi-stage purchase process. In this example, at least some of the elements 202 are presented with information 402 (e.g., micro-data) indicating a status of the user's progress in the particular stage, and/or information that has been provided by and/or generated for the user in this particular stage, e.g., through an associated data service. As described above, the elements 202 each include a control 502 that enables the launch of the particular data service interface associated with the stage, and the caption of the control may be presented according to the status of the stage and/or the particular type of activity (e.g., "Search") involved in the stage.

Figure 7:
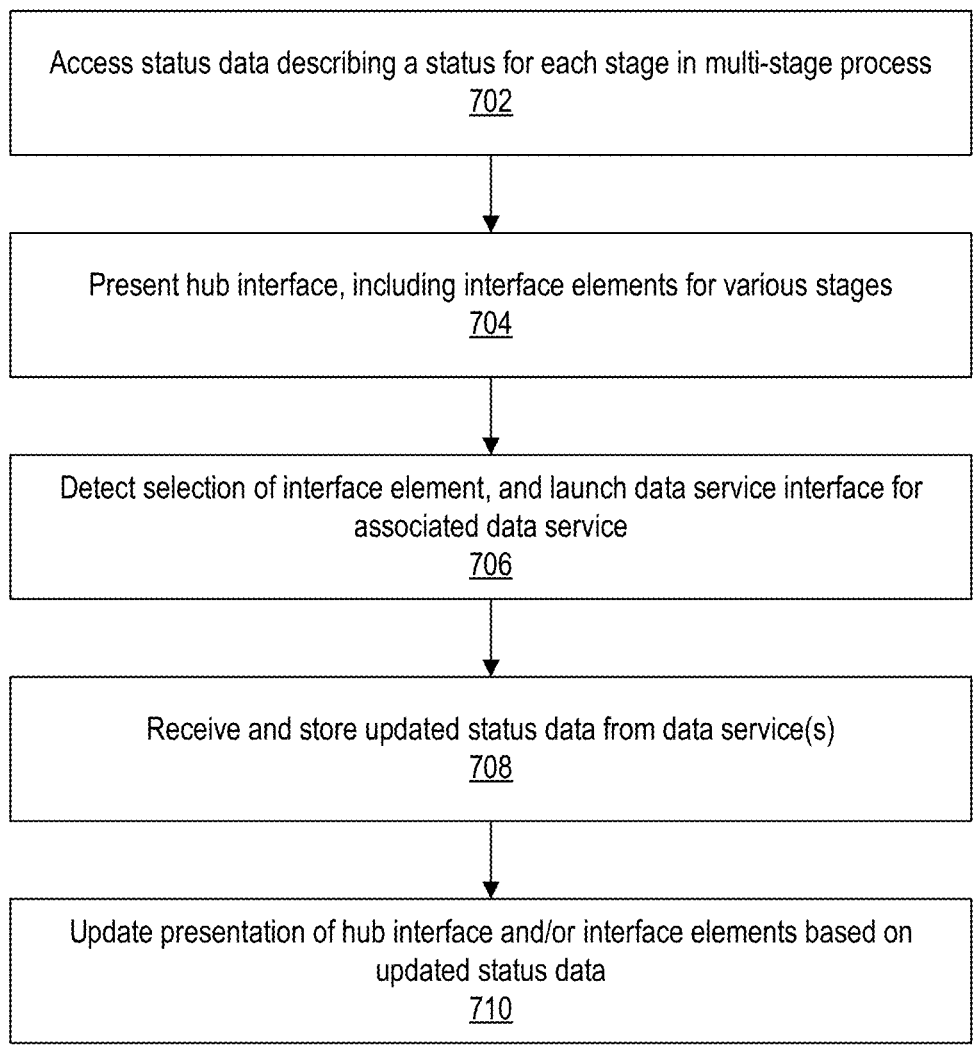
FIG. 7 depicts a flow diagram of an example process for presenting a hub interface for transaction processing, according to implementations of the present disclosure.

FIG. 7 depicts a flow diagram of an example process for presenting a hub interface for transaction processing, according to implementations of the present disclosure. Operations of the process can be performed by one or more of the integration engine 112, the hub interface 110, the data service interfaces, the data services 118, the ML module(s)

116, the user model(s) 114, the application 106, and/or other software module(s) executing on the platform 108, the user device 104, or elsewhere.

The status data 120 is accessed (702) from local storage on the platform 108 or elsewhere. As described above, the status data 120 can describe the status of the user for each stage in the multi-stage purchase process.

The hub interface 110 is presented (704), including interface elements for the various stages, as described above. The interface elements can be presented according to the status data for their respective stages. For example, the appearance of each element such as position, size, shape, color, and so forth can depend, in some instances, on the status of the respective stage. In some instances, the information (e.g., micro-data) presented in the interface element can reflect the current status of the stage and/or data that has been provided by and/or generated for the user as part of that stage in the purchase process.

A selection of an interface element is detected (706) and, in response, the corresponding data service can be launched. In some implementations, the interface for the data service is presented outside the hub interface, such as in its own window, browser tab, or separately executing application. In some implementations, the interface for the data service is presented within the hub interface, to provide a seamless user experience that may exhibit a same or similar look-and-feel as the hub. For example, the interface for the data service can be presented in a frame that is an expansion of the selected interface element.

The user can perform various activities, relevant to the stage, through the interface of the corresponding data service. The data service can provide updated status data, regarding that stage of the process, to the platform. The platform can receive and store (708) the updated status data received from the data service.

The platform can update (710) the presentation of the hub interface and/or its various interface element(s) based on the updated status data. For example, if the user provides information regarding a trade-in vehicle to a data service, the hub interface can update its presentation of the correspond interface element to include micro-data that describes the trade-in vehicle (e.g., year, make, model, etc.), its predicted trade-in value, and so forth.

The interface elements can be updated any appropriate number of times in response to changes in the status of the various stages and/or changes in the status data associated with the various stages. For example, the platform may present a first view of the hub interface, including various interface elements, which is later updated to present a second view of the hub interface in which one or more interface elements are shown with a changed appearance based on updated status of stages and/or updated status information. In some implementations, the status information shown as micro-data in an interface element may be at least partly context dependent, based on the particular user accessing the hub interface. For example, the default caption for an interface element, "Find your next vehicle," may be changed to read "Find your next truck," if the user profile of the user indicates that their last owned vehicle was a truck.

Figure 8:
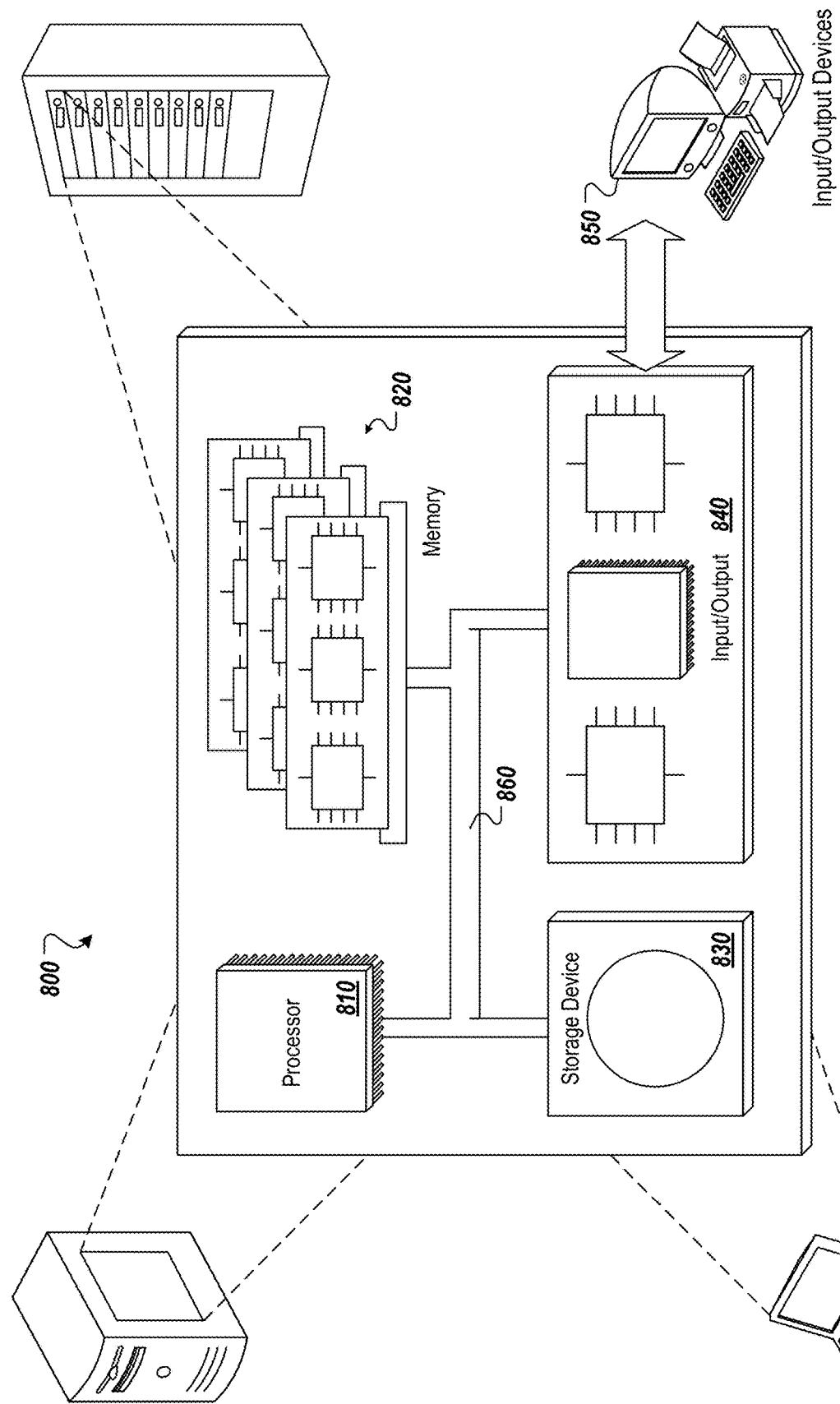
FIG. 8 depicts an example computing system, according to implementations of the present disclosure.

FIG. 8 depicts an example computing system, according to implementations of the present disclosure. The system 800 may be used for any of the operations described with respect to the various implementations discussed herein. For example, the system 800 may be included, at least in part, in one or more of the user device 104, the computing device(s) that provide the platform 108, the computing device(s) that provide the data service(s) 118, and/or other device(s) described herein. The system 800 may include one or more processors 810, a memory 820, one or more storage devices 830, and one or more input/output (I/O) devices 850 controllable through one or more I/O interfaces 840. The various components 810, 820, 830, 840, or 850 may be interconnected through at least one system bus 560, which may enable the transfer of data between the various modules and components of the system 800.

The processor(s) 810 may be configured to process instructions for execution within the system 800. The processor(s) 810 may include single-threaded processor(s), multi-threaded processor(s), or both. The processor(s) 810 may be configured to process instructions stored in the memory 820 or on the storage device(s) 830. The processor(s) 810 may include hardware-based processor(s) each including one or more cores. The processor(s) 810 may include general purpose processor(s), special purpose processor(s), or both.

The memory 820 may store information within the system 800. In some implementations, the memory 820 includes one or more computer-readable media. The memory 820 may include any number of volatile memory units, any number of non-volatile memory units, or both volatile and non-volatile memory units. The memory 820 may include read-only memory, random access memory, or both. In some examples, the memory 820 may be employed as active or physical memory by one or more executing software modules.

The storage device(s) 830 may be configured to provide (e.g., persistent) mass storage for the system 800. In some implementations, the storage device(s) 830 may include one or more computer-readable media. For example, the storage device(s) 830 may include a floppy disk device, a hard disk device, an optical disk device, or a tape device. The storage device(s) 830 may include read-only memory, random access memory, or both. The storage device(s) 830 may include one or more of an internal hard drive, an external hard drive, or a removable drive.

One or both of the memory 820 or the storage device(s) 830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 800. In some implementations, the CRSM may include a data store that provides storage of computer-readable instructions or other information in a non-transitory format. The CRSM may be incorporated into the system 800 or may be external with respect to the system 800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 810 and the memory 820 may be supplemented by, or incorporated into, one or more application-specific integrated circuits (ASICs).

The system 800 may include one or more I/O devices 850. The I/O device(s) 850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 850 may also include one or more output devices such as a display, LED(s), an audio output device (e.g., a speaker), a printer, a haptic output device, and so forth. The I/O device(s) 850 may be physically incorporated in one or more computing devices of the system 800, or may be external with respect to one or more computing devices of the system 800.

The system 800 may include one or more I/O interfaces 840 to enable components or modules of the system 800 to control, interface with, or otherwise communicate with the I/O device(s) 850. The I/O interface(s) 840 may enable information to be transferred in or out of the system 800, or between components of the system 800, through serial communication, parallel communication, or other types of communication. For example, the I/O interface(s) 840 may comply with a version of the RS-232 standard for serial ports, or with a version of the IEEE 1284 standard for parallel ports. As another example, the I/O interface(s) 840 may be configured to provide a connection over Universal Serial Bus (USB) or Ethernet. In some examples, the I/O interface(s) 840 may be configured to provide a serial connection that is compliant with a version of the IEEE 1394 standard.

The I/O interface(s) 840 may also include one or more network interfaces that enable communications between computing devices in the system 800, or between the system 800 and other network-connected computing systems. The network interface(s) may include one or more network interface controllers (NICs) or other types of transceiver devices configured to send and receive communications over one or more networks using any network protocol.

Computing devices of the system 800 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:
   at least one processor; and
   a memory communicatively coupled to the at least one processor, the memory storing instructions which, when executed by the at least one processor, cause the at least one processor to perform operations comprising:
   accessing, by a mobile device, status data describing a status for each of one or more stages in a process to acquire a vehicle;
   presenting, by the mobile device, a first view of a user interface that includes interface elements representing the process,
      wherein at least one of the interface elements comprises a vehicle search interface element, and
      wherein, in the first view, the vehicle search interface element is presented according to a first priority with respect to the user interface;
   determining, by a navigation system of the mobile device, a current location of the mobile device;
   determining, by the mobile device, that the current location of the mobile device corresponds to a location of a vehicle dealership; and
   responsive to determining that the current location of the mobile device corresponds to the location of the vehicle dealership, presenting, by the mobile device, a second view of the user interface,
   wherein in the second view:
      the vehicle search interface element comprises an indication of one or more vehicles associated with the vehicle dealership,
      the vehicle search interface is presented according to a second priority with respect to the user interface, and
      the second priority is higher than the first priority.

2. The system of claim 1, wherein presenting the first view of the user interface comprises presenting the vehicle search interface element at a first position in the user interface, and wherein presenting the second view of the user interface comprises presenting the vehicle search interface element at a second position in the user interface, wherein the first position is different from the second position.

3. The system of claim 2, wherein among the first position and the second position, the second position is nearer a top of the user interface.

4. The system of claim 1, wherein presenting the first view of the user interface comprises presenting the vehicle search interface element according to a first appearance in the user interface, and
wherein presenting the second view of the user interface comprises presenting the vehicle search interface element according to a second appearance in the user interface, wherein the first appearance is different from the second appearance.

5. The system of claim 1, wherein presenting the vehicle search interface element according to the second appearance in the user interface comprises highlighting a visual representation of the vehicle search interface element in the second view relative to a visual representation of the vehicle search interface element in the first view.

6. The system of claim 1, wherein each of the one or more vehicles associated with the vehicle dealership is a respective vehicle that is in stock in the vehicle dealership.

7. The system of claim 1, wherein each of the one or more vehicles associated with the vehicle dealership is a respective vehicle that is available for purchase at the vehicle dealership.

8. A computer-implemented method performed by at least one processor, the method comprising:
accessing, by a mobile device, status data describing a status for each of one or more stages in a process to acquire a vehicle;
presenting, by the mobile device, a first view of a user interface that includes interface elements representing the process,
wherein at least one of the interface elements comprises a vehicle search interface element, and
wherein, in the first view, the vehicle search interface element is presented according to a first priority with respect to the user interface;
determining, by a navigation system of the mobile device, a current location of the mobile device;
determining, by the mobile device, that the current location of the mobile device corresponds to a location of a vehicle dealership; and
responsive to determining that the current location of the mobile device corresponds to the location of the vehicle dealership, presenting, by the mobile device, a second view of the user interface,
wherein in the second view:
the vehicle search interface element comprises an indication of one or more vehicles associated with the vehicle dealership,
the vehicle search interface is presented according to a second priority with respect to the user interface, and
the second priority is higher than the first priority.

9. The method of claim 8, wherein presenting the first view of the user interface comprises presenting the vehicle search interface element at a first position in the user interface, and
wherein presenting the second view of the user interface comprises presenting the vehicle search interface element at a second position in the user interface, wherein the first position is different from the second position.

10. The method of claim 9, wherein among the first position and the second position, the second position is nearer a top of the user interface.

11. The method of claim 8, wherein presenting the first view of the user interface comprises presenting the vehicle search interface element according to a first appearance in the user interface, and
wherein presenting the second view of the user interface comprises presenting the vehicle search interface element according to a second appearance in the user interface, wherein the first appearance is different from the second appearance.

12. The method of claim 8, wherein presenting the vehicle search interface element according to the second appearance in the user interface comprises highlighting a visual representation of the vehicle search interface element in the second view relative to a visual representation of the vehicle search interface element in the first view.

13. The method of claim 8, wherein each of the one or more vehicles associated with the vehicle dealership is a respective vehicle that is in stock in the vehicle dealership.

14. The method of claim 8, wherein each of the one or more vehicles associated with the vehicle dealership is a respective vehicle that is available for purchase at the vehicle dealership.

15. One or more non-transitory computer-readable media storing instructions which, when executed by at least one processor, cause the at least one processor to perform operations comprising:
accessing, by a mobile device, status data describing a status for each of one or more stages in a process to acquire a vehicle;
presenting, by the mobile device, a first view of a user interface that includes interface elements representing the process,
wherein at least one of the interface elements comprises a vehicle search interface element, and
wherein, in the first view, the vehicle search interface element is presented according to a first priority with respect to the user interface;
determining, by a navigation system of the mobile device, a current location of the mobile device;
determining, by the mobile device, that the current location of the mobile device corresponds to a location of a vehicle dealership; and
responsive to determining that the current location of the mobile device corresponds to the location of the vehicle dealership, presenting, by the mobile device, a second view of the user interface,
wherein in the second view:
the vehicle search interface element comprises an indication of one or more vehicles associated with the vehicle dealership,
the vehicle search interface is presented according to a second priority with respect to the user interface, and
the second priority is higher than the first priority.

16. The one or more non-transitory computer-readable media of claim 15, wherein presenting the first view of the user interface comprises presenting the vehicle search interface element at a first position in the user interface, and
wherein presenting the second view of the user interface comprises presenting the vehicle search interface element at a second position in the user interface, wherein the first position is different from the second position.

17. The one or more non-transitory computer-readable media of claim 16, wherein among the first position and the second position, the second position is nearer a top of the user interface.

18. The one or more non-transitory computer-readable media of claim 15, wherein presenting the first view of the user interface comprises presenting the vehicle search interface element according to a first appearance in the user interface, and wherein presenting the second view of the user interface comprises presenting the vehicle search interface element according to a second appearance in the user interface, wherein the first appearance is different from the second appearance.

19. The one or more non-transitory computer-readable media of claim 15, wherein presenting the vehicle search interface element according to the second appearance in the user interface comprises highlighting a visual representation of the vehicle search interface element in the second view relative to a visual representation of the vehicle search interface element in the first view.

20. The one or more non-transitory computer-readable media of claim 15, wherein each of the one or more vehicles associated with the vehicle dealership is a respective vehicle that is in stock in the vehicle dealership.

21. The one or more non-transitory computer-readable media of claim 15, wherein each of the one or more vehicles associated with the vehicle dealership is a respective vehicle that is available for purchase at the vehicle dealership.

* * * * *